United States Patent [19]

Volpe et al.

[11] Patent Number: 4,534,814

[45] Date of Patent: Aug. 13, 1985

[54] LARGE-SCALE PRINTHEAD FOR NON-IMPACT PRINTER AND METHOD OF MANUFACTURE

[75] Inventors: Luke Volpe, Melrose; Lowell E. Thomas, Tewksbury, both of Mass.

[73] Assignee: Dynamics Research Corporation, Wilmington, Mass.

[21] Appl. No.: 510,921

[22] Filed: Jul. 5, 1983

[51] Int. Cl.[3] .................. B32B 31/00; B29C 19/00; G01D 15/10; H05B 1/00
[52] U.S. Cl. .................. 156/300; 156/152; 156/228; 156/297; 156/299; 156/304.1; 346/76 PH; 346/155; 219/216; 219/143; 400/120; 338/307
[58] Field of Search ............ 156/89, 252–253, 156/182, 228, 297, 299, 300, 304.1; 346/131 C, 155, 76 PH, 76 R; 219/216 PH, 543; 400/120; 338/307–309

[56] References Cited

U.S. PATENT DOCUMENTS 3,955,204  5/1976  Anton ........................ 346/139 C
4,415,403  11/1983  Bakewell .................... 366/139 C Primary Examiner—Edward C. Kimlin
Assistant Examiner—Merrell C. Cashion
Attorney, Agent, or Firm—Weingarten, Schurgin Gagnebin & Hayes

[57] ABSTRACT

A large-scale printhead is made up of rows of styli patterned onto thin glass substrates sandwiched together between rugged support substrates, in which a series of thin glass substrate sections are internally butted one to the other. Fabrication of multiple rows of elements is accomplished by stacking the delicate styli-bearing substrates on an associated rugged substrate. In a preferred embodiment, all glass substrates are utilized, with the transparency of the glass permitting accurate alignment of the styli or nibs. The use of glass substrates also increases the wear resistance of the completed printhead. A specialized bus matrix permits reduction in the width of the substrates carrying the styli, with the bus structure being formed on a single side of the substrate carrying the styli, such that thru-holes need not be provided through the thin substrates. A staggered, offset, oppositely facing contact pad structure is provided at the base of styli-bearing substrates to accommodate multiple rows of printing elements.

4 Claims, 11 Drawing Figures

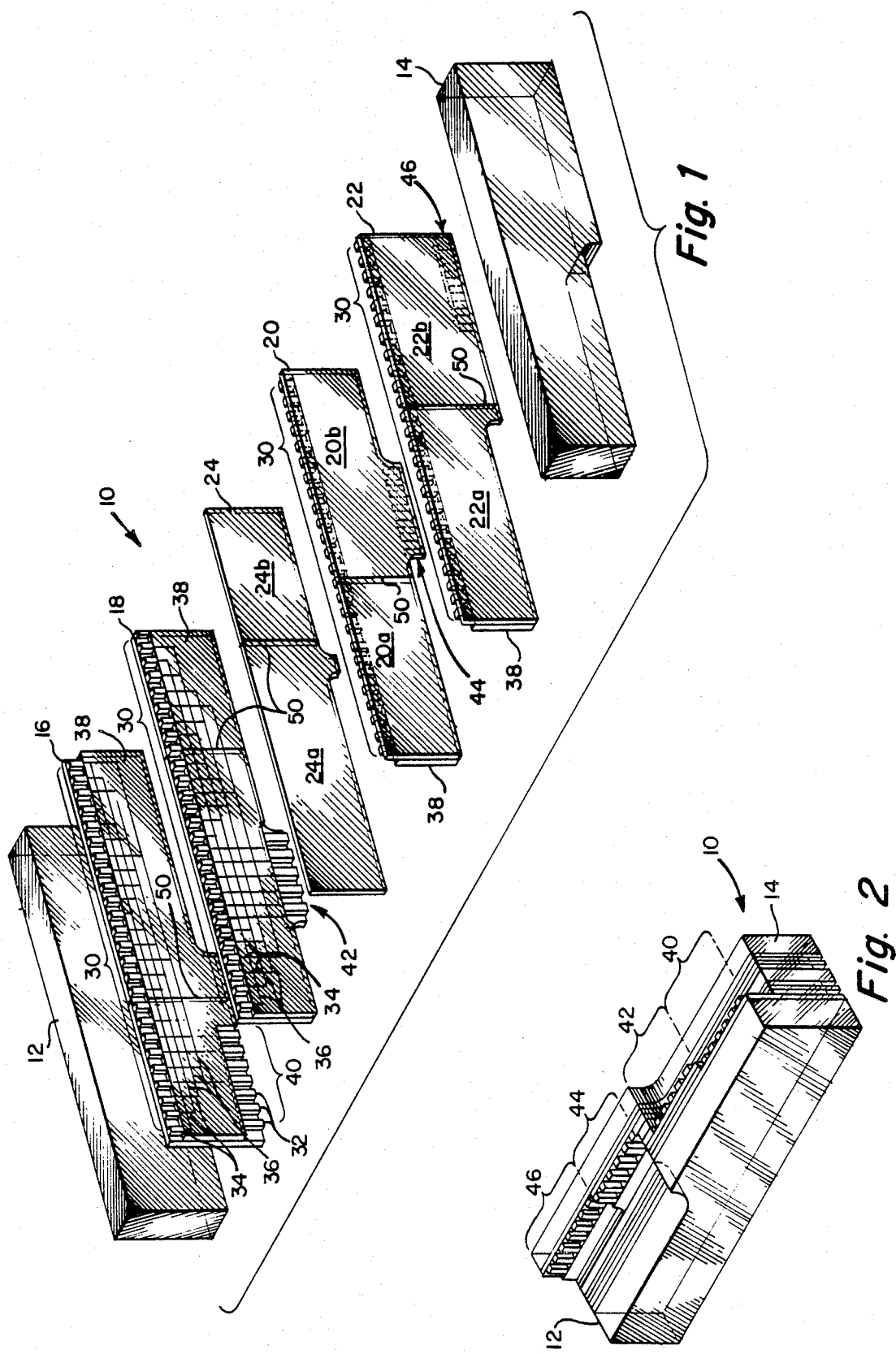

4,534,814

LARGE-SCALE PRINTHEAD FOR NON-IMPACT PRINTER AND METHOD OF MANUFACTURE

FIELD OF THE INVENTION

This invention relates to printheads for nonimpact printers, and more particularly to a large-scale printhead and its method of manufacture.

BACKGROUND OF THE INVENTION

Nonimpact printers in general utilize either electrostatic or thermal print elements called styli or nibs, which when activated produce a mark on paper or other print media running across the printhead. One type of printhead utilizing staggered rows of nibs and glass, porcelain, or ceramic substrates is illustrated in U.S. Pat. No. 3,578,946. Printheads of this type utilize substrates made out of hard materials to prevent erosion of the printhead with use. These printheads are in general very short in length, and their manufacture in lengths over, for instance, 12 inches, is exceedingly difficult due to the delicate nature of the substrate material. Because the materials are delicate, breakage in fabrication often precludes the ability to fabricate large-scale printheads. These printheads are useful, for instance, in cartography, printed circuit layout printing, hard-copy line plots for LSI designing, CAD/CAM plots, and large-scale sonar surveillance charting.

While large-scale printheads have been made in the past with wires potted in epoxy, these large-scale printheads suffer dramatically from wear due to the low wear resistance of the epoxy potting compound. These printheads also suffer from resolution problems commensurate with the ends of the wires which are cut off after being embedded in plastic. The poor wear characteristics of the prior art potted printheads aside, resolution of at most 50–100 lines per inch is all that is available using wire-potting techniques. While wire-potting does permit manufacture of large-scale printheads, none can approach magazine quality of 200–400 lines per inch, or indeed such detail as would be afforded by a system which can produce 800–1000 lines per inch, such as the subject system which will be described hereinafter.

While it might have been thought that in order to achieve an elongated printhead, all that would have to be done would be to butt shorter printheads together, this is impractical. First, the butting process is one involving finished printheads. By chamfering or obliquely slicing finished printheads through sawcutting, polishing, and the like, many finished printheads will be damaged, and the cost of such a process is increased by the resulting decreased yield. Assuming that one were successful in fashioning the buttable short printheads, the finished printhead would have butting lines or crevices across it which would entrap fibers of paper or other types of contamination in the printer itself. Also the printhead would wear unevenly at the crevices, so that the mere butting together of short printheads is both economically unfeasible and results in a printhead which entraps fibers and which wears unevenly.

It will be appreciated that in the normal printhead configuration, rows of printing styli or nibs are packed relatively close together such that the spacing between one row of styli and another row of styli is typically on the order of 10 mils. In order to accomplish the 10-mil spacing between rows of styli, it is important that the substrate bearing the styli be relatively thin. The thinness of the substrates on which the styli are patterned presents insurmountable manufacturing problems when attempting to obtain and handle long, very fragile, thin substrates. It should be noted that the shorter the printhead substrate, the less prone it is to breakage. Each long broken substrate represents the breakage of a costly completed substrate having a row of styli or nibs interconnected with patterned bus structures, sometimes involving the use of thru-holes which run through the thin, fragile substrate. The yield for thru-holed thin substrates is low, and additional breakage during patterning and subsequent handling makes a successfully completed substrate a valuable commodity. If these valuable completed substrates are then to be cut and butted, further damage to completed substrates can occur which results in the loss of a complex costly part.

SUMMARY OF THE INVENTION

A large-scale printhead for a non-impact printer includes an internally butted printhead made up of rows of styli which are patterned onto short, thin substrate sections butted together. The thin substrates are supported and adhesively affixed to an underlying thick, rugged support substrate which acts as a carrier to maintain the substrate sections in the same plane. If only two rows of styli are required, the styli-bearing substrate sections are built up on opposing support substrates, which are then adhesively sandwiched together to provide the two rows. For more than two rows, each additional row of styli is built up on the row beneath it. The thin substrate sections associated with the additional row are adhesively attached to the thin substrate sections making up the underlying row, with the thin substrate sections making up the underlying row providing a rigid support base for the substrate sections making up the additional row. This is because the substrate sections making up the underlying row are cemented to the thick, rugged carrier.

During the butting process, the inter-nib or inter-styli spacing may be adjusted when the butting substrate sections are adhesively attached to the underlying substrate. This adjustability assists in the phasing of the nibs to preserve the resolution obtainable by thick film patterning. This thick film resolution greatly exceeds that which is obtainable with standard potted-wire large-scale printheads. The alignment of the nibs on abutting substrate sections and the alignment of adjacent rows are facilitated through the utilization of transparent substrates and carriers such as those made of glass. The optically transparent substrates permit accurate fabrication and therefore increased printhead resolution.

The butt joints for the substrate sections in adjacent rows are staggered such that when a composite sandwich structure is obtained, there is no butt joint which runs from one side of the printhead to the other. Thus the thin butt joint lines or crevices in the completed printhead are staggered and do not present a long crevice line which would entrap particles or paper fibers. In this sense, there is no alignment of butt joints in the direction of travel of the print media which runs over the printhead. Moreover, there is no long crevice line which would produce uneven printhead wear. Rather, in the completed printhead, only the thin substrate sections are internally butted, with the support substrates or carriers being continuous. This provides not only a rigid support structure for the butted, thin substrate sections, but also provides that the majority of the printhead face is smooth.

If the completed printhead utilizes glass for all substrates and carriers, the wear characteristics of the printhead are markedly improved over potted-wire printheads. In the subject fabrication method, ability to use thin styli-bearing substrates permits a minimum inter-row spacing such that a reasonably sized printhead may be manufactured with heretofore very fragile, difficult to handle but wear-resistant substrate materials.

In order to minimize the width of the printhead, a specialized bus matrix permits reduction in width of the substrates carrying the styli or nibs and thus the overall width of the finished printhead. The width, as defined herein, is the distance between the face of the printhead which carries the styli and the bottom of the printhead at which electrical contact is made. The length of the printhead refers to the length of the face, and the width of the face is hereinafter referred to as the thickness of the printhead. The specialized bus matrix is used for printheads which simultaneously actuate styli in a number of groups. For instance, if each group has 128 styli, and elongated printhead may have as many as 18 groups of 128 styli. If, for example, a printhead with 200-dot-/inch resolution were to be made, then on a 12-inch long head there would be over 18 groups of 128 styli. Addressing for the styli is conventionally accomplished by simply interconnecting the identical styli in each group with a horizontally running bus bar. The pattern produced by such a conventional arrangement results from the position of the ends of vertical busses running from the styli down the width of the particular substrate involved. These ends terminate along predetermined slant lines defining a sawtooth pattern. The sawtooth pattern takes up a certain amount of vertical distance which in turn requires that the width of the substrate be longer than it needs to be. By dividing the pattern represented by the slant in half to provide a reverse slant for half of the styli in a group, a triangular pattern of V's or W's results. This provides for the possibility of horizontal bus interleaving, with the result that the width of the thin substrate can be halved over that possible with the sawtooth pattern configuration. What the V- or W-type configuration provides is that the ends of the vertically running busses may be maintained at sufficient spacing to prevent solder shorting between bus ends, whereas the horizontal running bus structures may be patterned at a fraction of the original interbus spacing.

The horizontal busses are led down to the lower edge of each styli-bearing substrate, with the lower edges of the styli-bearing substrates being cut away such that when the substrates are stacked one on top of the other, contact pads on the associated styli-bearing substrates are exposed in an offset and adjacent manner to permit electrical connection. In one embodiment, the contact pads on the bottom edges of half of the styli-bearing substrates face in one direction, with the other half facing in the other direction. This accommodates building half of the rows on one carrier substrate and half on another carrier substrate, and cementing the facing rows together to obtain a composite sandwich structure.

What is therefore provided is an extremely cost-effective, high resolution, large-scale printhead. Extremely high resolution is achieved by first electroforming the nibs or styli and associated vertical conductors as described in U.S. patent application Ser. No. 260,266, filed by Lowell E. Thomas and assigned to the assignee hereof, and then by thick film screening deposit the horizontal bus matrix or conductors and interconnections.

The connections between the vertically running busses and the horizontally running busses are made, not through via holes or thru-holes in the rather fragile styli-bearing substrate, but are made through patterned holes in an overlying transparent dielectric layer. The nibs and the vertically running busses are first patterned on a glass substrate section, with the glass substrate section then being provided with a patterned, dielectric with via holes or thru-holes in the dielectric being patterned over the ends of the vertically running busses. The patterned dielectric layer does not extend over the styli or nibs. Horizontally running busses are then patterned onto the dielectric layer and down into the via holes so that each horizontally running bus is electrically connected to a predetermined vertically running bus through the corresponding via holes in the dielectric layer. A further dielectric layer is then provided over the horizontal running busses to provide a smooth, flat surface for the positioning of the substrate sections of an additional row. This further dielectric layer is also patterned so as not to cover the styli, with the thickness of the further layer being such as to bring its surface flush with the corresponding surfaces of the styli.

By providing that the bus structure be carried only on one surface of the substrate section, via holes are avoided in the thin, fragile substrate. This dramatically increases yields and permits the economical use of the thin hard substrates for the styli or nib carrier.

What is therefore provided is an extremely cost-effective, large-scale printhead which is thin and which nonetheless is highly wear-resistant, with the completed structure being exceptionally rigid and rugged, and with the resolution being that associated with thick-film depositions on glass, as opposed to embeddedwire large-scale printheads. The sandwich structure and the internal butting dramatically increases the yields with thin glass substrates and reduces printhead contamination. The bus matrix maximizes the utilization of substrate real estate and provides for ready connection to the printhead.

BRIEF DESCRIPTION OF THE DRAWINGS

These and other features of the subject invention will be better understood in connection with the detailed description taken in conjunction with the drawings of which:

FIG. 1 is an exploded view of the subject printhead, illustrating the internal butting of the substrate sections;

FIG. 2 is an isometric view of the bottom of a printhead turned upside-down, showing the staggered offset contact pad system;

DETAILED DESCRIPTION

Figure 3:
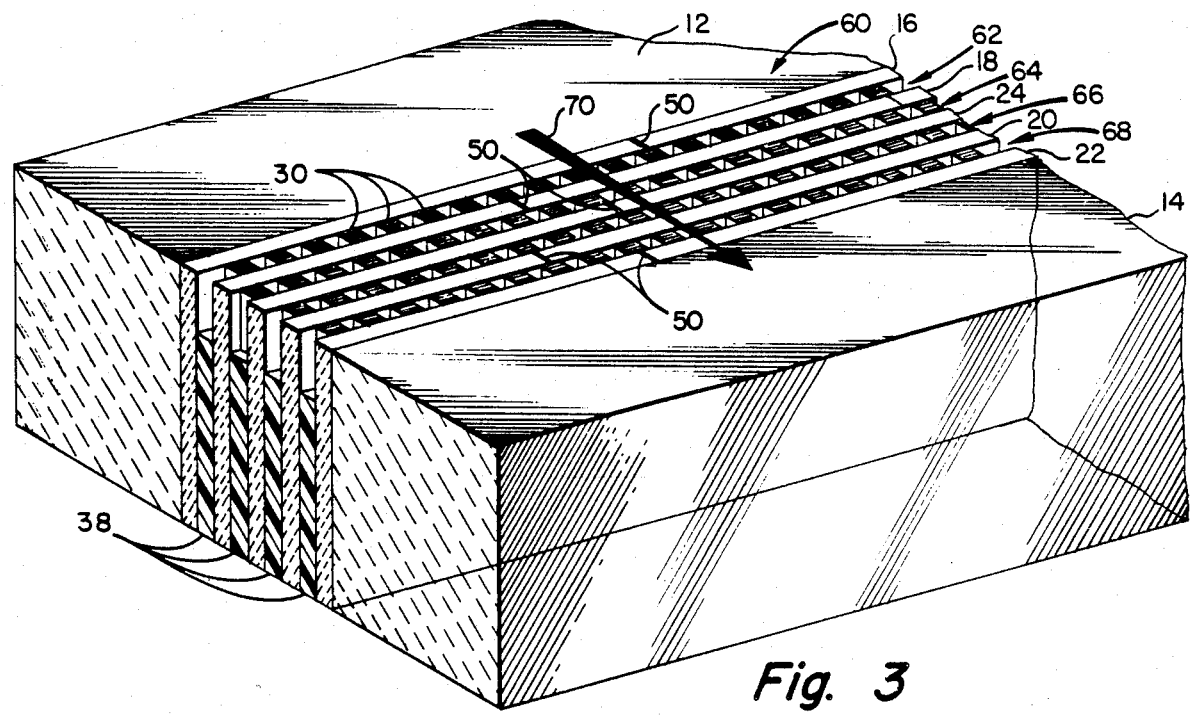
FIG. 3 is a diagrammatic and cross-sectional illustration of the writing surface for the subject printhead, illustrating the staggered internal butting structure for a four-row printhead.

Referring now to FIG. 1, a large-scale multi-row printhead 10 for nonimpact printers includes a composite sandwich structure including, in one embodiment elongated continuous rugged glass support substrates in the form of carriers 12 and 14 between which are sandwiched segments, thin, segmented styli-bearing substrates 16, 18, 20, and 22. Between substrates 18 and 20 is sandwiched a thin, segmented spacer 24, also of glass in a preferred embodiment. Thus all the substrates and spacer are made of glass in a preferred embodiment.

Carriers 12 and 14 run the length of the completed printhead and, in one embodiment, are made of ¼" glass. It will be appreciated that glass having a thickness of ¼" or better can be obtained in extremely long lengths, preferably 48 or 72 inches, depending on the completed printhead length. Other materials for the carriers are metal and ceramic, although it is preferable that the carriers be optically transparent for subsequent alignment of the styli carried by segmented substrates 16–22.

Each of the styli-bearing substrates is segmented such that individual styli-bearing substrate sections are butted together in a single plane to provide an array of printhead elements in the form of styli 30. Preferably each substrate section carries a number of groups of styli and its own bus matrix and associated contact pads. While two substrate sections per row are illustrated, any number of substrate sections can be used.

Spacer 24 is likewise segmented as illustrated such that sections are butted to provide the overall length of spacer required. In a preferred embodiment, the spacer is glass, although it may be made of other materials such as glass/epoxy and ceramic. The spacer is also preferably optically transparent.

Each of the styli-bearing substrate sections is provided with styli 30 exposed at the top edge of the corresponding substrate section. These styli are connected to contact pads 32 at a lower edge of the substrate, with the interconnecting matrix being a combination of a vertical set of busses extending from corresponding styli, such as illustrated at 34, and a horizontally running set of busses, here illustrated at 36 which connect selected vertical busses to selected contact pads. As will be described in connection with FIG. 6, the vertical busses are overlain with a patterned transparent dielectric having apertures at predetermined positions over which is provided a patterned set of horizontal busses, with all but the styli and contact pads being overcoated with a smooth, protective dielectric layer, here illustrated at 38.

The sets of contact pads for substrates 16, 18, 20, and 22 are laterally offset as illustrated at 40, 42, 44, and 46, such that when the sandwich structure is completed, these sets of contact pads are adjacent one another and are exposed as illustrated in FIG. 2 to permit electrical contact. It will be appreciated that contact pads and respective styli of substrates 16 and 18 face in one direction, whereas contact pads and styli of substrates 20 and 22 face in an opposite direction. This permits exposure of the four different sets of contact pads in an offset manner, with the sets of contacts not only being laterally offset but also being offset in the thickness direction of the printhead. Note that the two different sets of contact pads are exposed in different directions with each set being supported by a support substrate cut away elsewhere to expose the contact pads facing it.

Referring again to FIG. 1, it is a feature of the subject large-scale printhead that all thin substrates and the spacer are segmented with the segments abutting one another along butt lines 50. These butt lines are arranged in a staggered fashion, such that no butt line is aligned with any other butt line in the direction of the movement of paper across the printhead. This prevents contamination by fibers or other debris and precludes uneven wear of the printhead, while at the same time providing cost-effective manufacture of the printhead.

The use of butted segments or sections for styli-bearing substrates not only reduces breakage because of the relatively small size of the substrates, but also permits replacing of a damaged substrate section as opposed to replacing the entire row as would be required if elongated continuous substrates were utilized for segmented substrates 16–22.

Referring to FIG. 3, a portion 60 of the printhead of FIG. 1 as assembled illustrates four rows 62, 64, 66, and 68 of styli 30 on corresponding substrates 16–22, with the styli pattern being offset as illustrated. Here butt lines 50 are illustrated as being staggered such that none of the butt lines are aligned in the direction illustrated by arrow 70, which is the direction of paper travel across the printhead face. A method of manufacture of the printhead is now described in connection with FIGS. 4–6.

Figure 4:
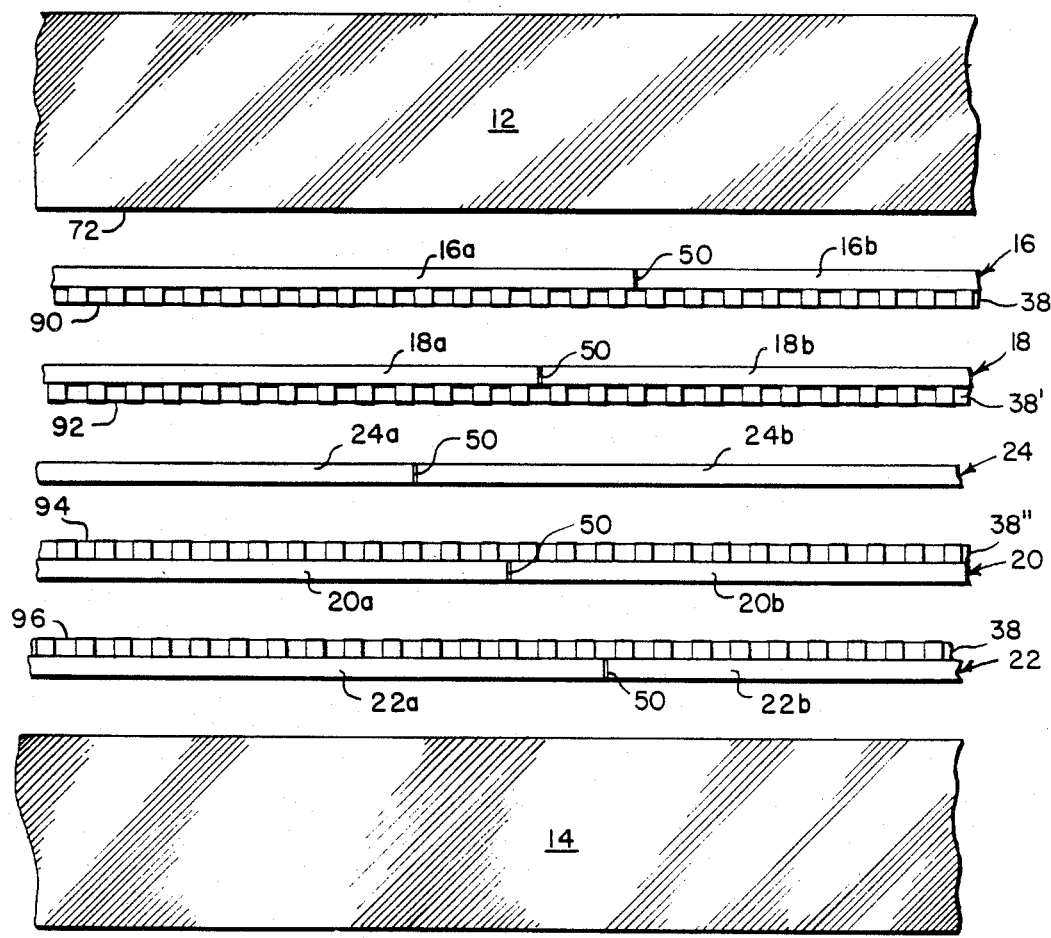
FIG. 4 is a diagrammatic and exploded illustration of the fabrication process involved in fabricating the printhead of FIG. 3.
Figure 5:
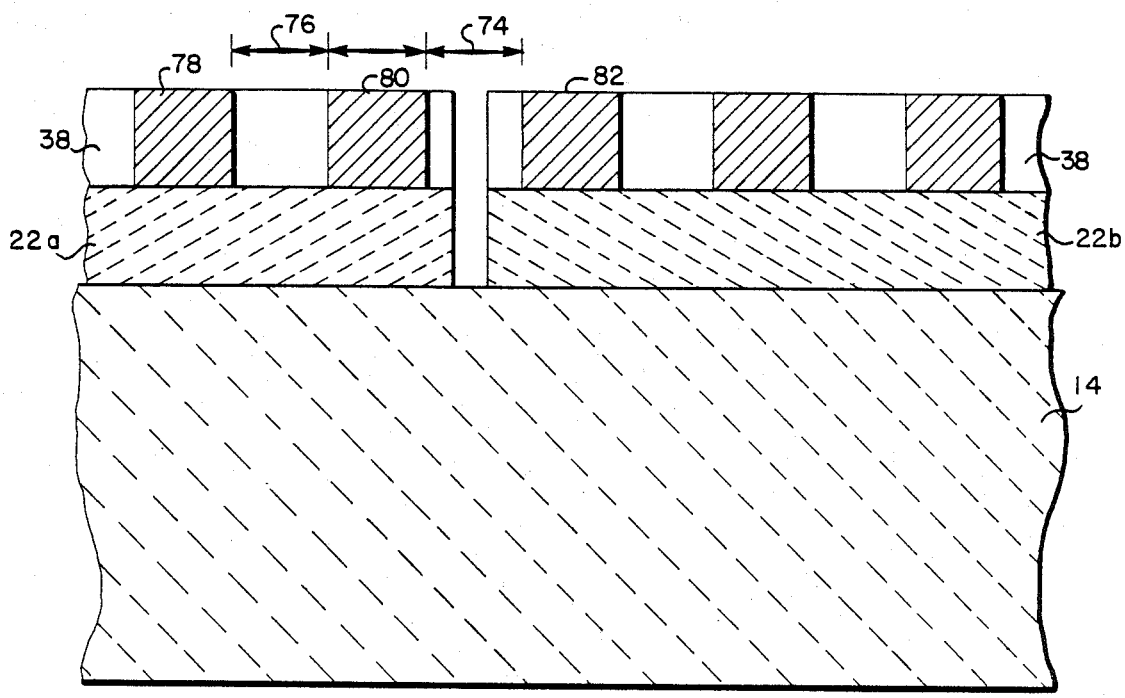
FIG. 5 is a cross-sectional illustration of the butting of two adjacent styli-bearing substrate sections mounted to a support substrate.
Figure 6A:
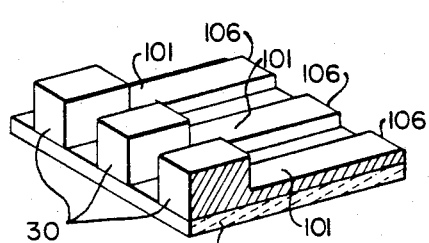
FIG. 6 is a diagrammatic illustration of the steps of providing a single-sided bus structure for the connection of styli to horizontally running busses.
Figure 6B:
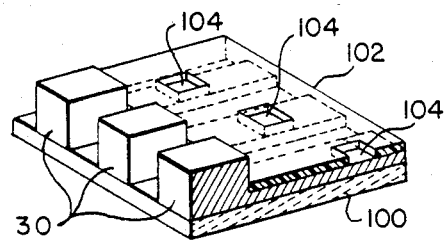
Figure 6C:
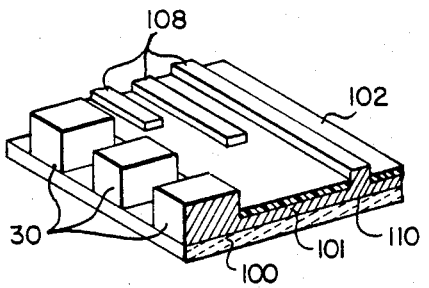
Figure 6D:
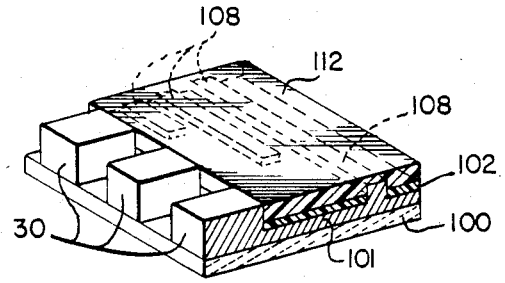

Referring now to FIG. 4, the composite printhead is fabricated by providing the aforementioned support substrates and as a first step, adhesively attaching a first series of substrate sections 16a, 16b to surface 72 of substrate 12. These substrate sections have been provided with styli, an interconnect bus matrix, and a protective layer at all places but the styli and the contact pads; and are arranged, as illustrated in FIG. 5, such that the styli spacing as indicated by double-ended arrow 74 is the same styli spacing as illustrated by double-ended arrow 76. This provides that the original spacing between styli 78 and 80 is maintained between styli 80 and 82. This alignment can be easily accomplished because of the transparency of the support substrate or carrier here illustrated at 14 and the styli-bearing substrate sections here illustrated at 22a and 22b. Note that each substrate section 22a and 22b has a protective layer 38.

Referring back to FIG. 4, substrate sections 18a and 18b are cemented to the surface 90 presented by layer 38 such that not only is the inter-styli spacing maintained between the substrate sections, but also the appropriate alignment between the styli on substrate 18 and the styli on substrate 16 is assured. Thereafter, spacer sections 24a and 24b are cemented to surface 92 of layer 38'. Substrates 20 and 22 are built up similarly on substrate 14, and the composite structure is then obtained by cementing surface 94 of layer 38' to spacer 24.

While a four-row printhead has been described in connection with FIGS. 1–4, it will be appreciated that any number of rows can be fabricated in the above manner, with a two-row printhead merely eliminating substrates 18 and 20 in the above-noted fabrication process. Also a single-row printhead can be made by this process.

The above adhesive attachment may be accomplished by a layer of liquid state uncured epoxy which is spread between the two layers to be attached. All excess epoxy and air bubbles are worked out by hand manipulation. Excess epoxy is removed with a suitable solvent and the entire assembly cured at the appropriate temperatures.

Referring now to FIG. 6, a single-sided contact structure for the styli which obviates the necessity of providing via holes or thru-holes in a thin styli-bearing substrate first requires that styli 30 and busses 101 be deposited on the substrate here illustrated at 100. Thereafter, a dielectric layer 102 is deposited over the busses and the top surface of the substrate, with apertures 104 being positioned in a predetermined pattern over busses 101. Note that none of layer 102 is deposited over the styli. Thereafter, horizontally running busses 108 are patterned over layer 102 such that as illustrated at 110, a patterned bus extends down into the associated aperture and contacts the corresponding bus. Thereafter, a dielectric layer 112 is deposited over all but the styli and the contact pads (not shown in this figure) and forms the protective smooth layer which finishes off the styli-bearing substrate.

While in the past, expensive thru-holes have been provided in the styli-bearing substrate to prevent the shorting of the horizontal busses to the vertical busses, no thru-holes are provided in this system. Rather, an apertured dielectric is utilized which precludes damage to the thin styli-bearing substrate which would be caused by providing thru-holes. The dielectric may also be transparent, and in one embodiment is epoxy. Other dielectrics are SiO and thick film paste. The patterned dielectrics may be deposited in any known manner such as by vacuum deposition, silkscreening, or any photographic patterning process.

Figure 7:
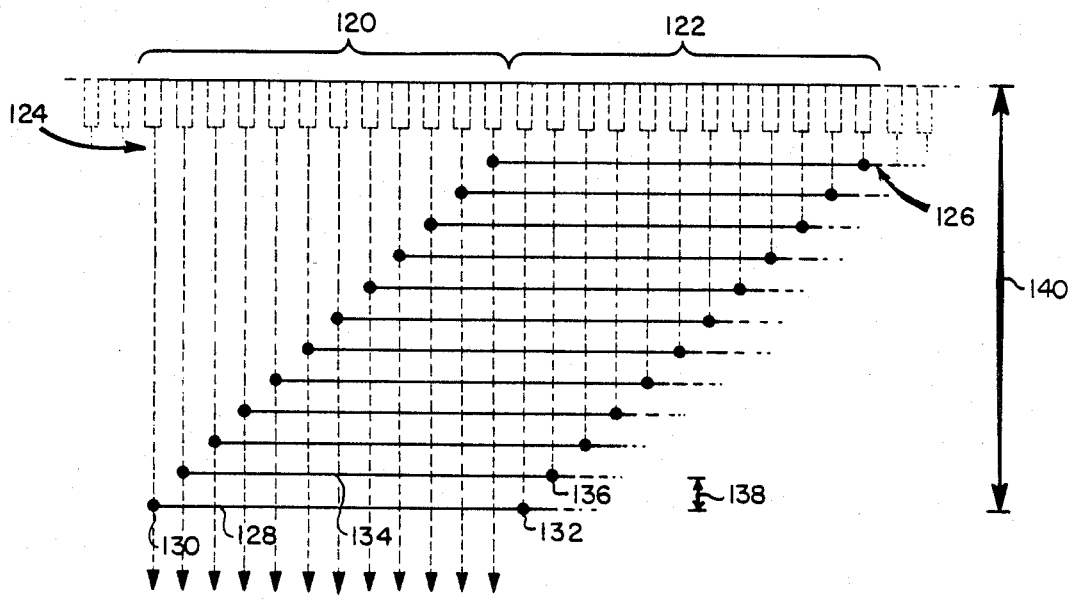
FIG. 7 is a diagrammatic illustration of a conventional bus matrix structure for the connection of groups of styli.
Figure 8:
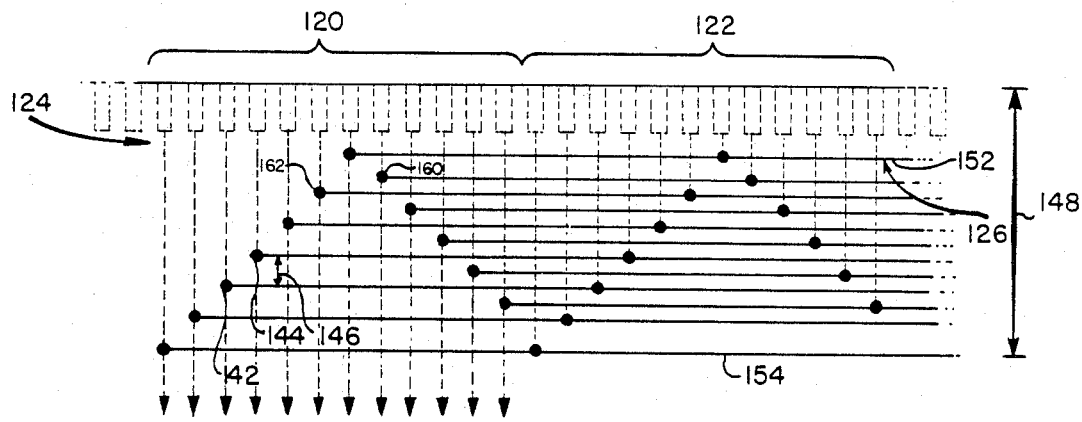
FIG. 8 is a diagrammatic illustration of a specialized bussing matrix wherein the ends of vertically running busses define a triangular or inverted-V shaped interconnection pattern.

Referring now to FIG. 7, groups of styli 120 and 122 coupled to vertical busses 124 are to be connected to horizontal busses 126 such that like-numbered styli in the various groups are connected in parallel to a single bus. Thus stylus no. 1 of group 120 is connected to stylus no. 1 of group 122 by bus 128 at interconnection points 130 and 132. These interconnection points correspond to the ends of vertically running busses which extend down from corresponding styli nibs. It will be appreciated that the spacing between the bus 128 and, for instance, adjacent bus 134 is such that the solder connection at point 132 does not short out the solder connection at point 136. This requires a minimum vertical spacing, as illustrated by arrow 138, which establishes the overall substrate width indicated by double-ended arrow 140. Thus, the real estate for the required interconnection is a function of the separation between the ends of the vertical busses. As will be seen, the interconnection dot pattern resembles a sawtooth pattern, the height of which can be reduced as illustrated in FIG. 8. In FIG. 8 it will be appreciated that the spacing between dots 142 and 144 illustrated by double-ended arrow 146 is the same as the spacing between dots 132 and 136 of FIG. 7. This spacing is illustrated by double-ended arrow 138. However, the overall width of the substrate illustrated by arrow 148 is approximately cut in half. Thus the triangular inverted-V shaped arrangement, while effectuating the same interconnect strategy, reduces the width of the styli-bearing substrate and thus the overall width of the printhead. Only the top and bottom busses 152 and 154 are required to be further displaced from the adjacent busses so as to preserve the required dot spacing illustrated by arrows 146 and 138. It should be noted that the dots to the right-hand side of each inverted V are vertically offset from their corresponding dots on the left-hand side of the V. This permits closer interleaving of the horizontal busses. For instance, dot 160 is vertically offset from corresponding dot 162 as illustrated. Moreover, the pattern can be folded again to further decrease the width. The number of foldings is finally limited by the allowable spacing between horizontally running lines and the size of the interconnect points or dots.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A method of fabricating a large-scale printhead comprising the steps of
   providing a first support substrate;
   adhering a number of butted styli-bearing substrate sections to the first support substrate to provide a first composite structure in which the butted sections lie in the same plane;
   providing a second support substrate;
   adhering a number of butted styli-bearing substrate sections to the second support substrate to provide a second composite structure in which the butted sections lie in the same plane; and
   adhering the first and second composite structures together such that the butted styli-bearing substrate sections on each of the first and second support substrates are facing each other.

2. The method of claim 1 and further including the step of inserting a spacer between the first and second composite structures.

3. The method of claim 1 wherein said support substrate and said substrate sections are optically transparent to facilitate adjustment of inter-styli spacing between butted substrate sections when butted substrate sections are adhered to a support substrate.

4. The method of claim 1 and further including the step of adhering a second set of butted styli-bearing substrate sections on top of the substrate sections carried by either first or second support substrate.

* * * * *